United States Patent [19]

Snyder

[11] 3,960,628
[45] June 1, 1976

[54] STEEL-BELTED RADIAL PLY TIRES WITH 0° TEXTILE CAP BAND

[75] Inventor: Robert H. Snyder, Grosse Pointe Park, Mich.

[73] Assignee: Uniroyal Inc., New York, N.Y.

[22] Filed: Mar. 12, 1974

[21] Appl. No.: 450,506

Related U.S. Application Data

[60] Division of Ser. No. 334,198, Feb. 21, 1973, Pat. No. 3,850,219, which is a continuation-in-part of Ser. No. 281,890, Aug. 18, 1972, abandoned.

[52] U.S. Cl. .............................. 156/123; 156/128 R; 156/133
[51] Int. Cl.[2] .................... B29H 17/02; B29H 17/14
[58] Field of Search ............ 156/110, 123 R, 123 A, 156/124, 126, 127, 128, 128 I, 129, 133; 152/354–361, 361 FP, 361 DM

[56] References Cited

UNITED STATES PATENTS

| | | | |
|---|---|---|---|
| 2,826,233 | 3/1958 | Cooper | 152/361 |
| 2,982,328 | 5/1961 | Emanueli et al. | 152/361 R |
| 3,503,432 | 3/1970 | Maiocchi | 152/176 |
| 3,599,696 | 8/1971 | Hartz | 152/361 R |
| 3,762,458 | 10/1973 | Yoshida et al. | 152/361 R |
| 3,772,130 | 11/1973 | Marzocchi | 152/359 |

FOREIGN PATENTS OR APPLICATIONS

| | | | |
|---|---|---|---|
| 227,160 | 4/1963 | Austria | 156/123 |
| 1,416,538 | 2/1965 | France | 156/128 I |
| 1,182,274 | 1/1959 | France | 156/124 |

*Primary Examiner*—William A. Powell
*Assistant Examiner*—John E. Kittle
*Attorney, Agent, or Firm*—Herbert A. Stern

[57] ABSTRACT

A steel-belted radial ply tire construction characterized by improved uniformity and resistance to ply separation, and a method of manufacturing such tires in non-segmented molds, are disclosed. In the finished tire, a cap band having at least one layer of rubberized tire cords of synthetic filamentary textile material is disposed in direct surrounding relation to the radially outermost belt ply of bias-angled steel cords, the cap band having a width equal to or greater than the width of the belt, with the cords in the cap band being disposed parallel to one another and to the median equatorial plane of the tire, i.e., at an essentially 0° bias angle. The cords in the cap band are prestressed, due to their having been stretched about 1 to 5% in the manufacturing operation during the final expansion of the tire into the mold contours under high internal pressure, so as to exert a stability and uniformity-enhancing compressive stress on the underlying belt. The cap band also serves, during the final in-mold expansion of the tire during the manufacturing process, to ensure uniform pantographing of the steel cords in the belt plies to their desired bias angles. This abstract is not to be taken either as a complete exposition or as a limitation of the present invention, however, the full nature and extent of the invention being discernible only by reference to and from the entire disclosure.

5 Claims, 4 Drawing Figures

U.S. Patent   June 1, 1976   3,960,628
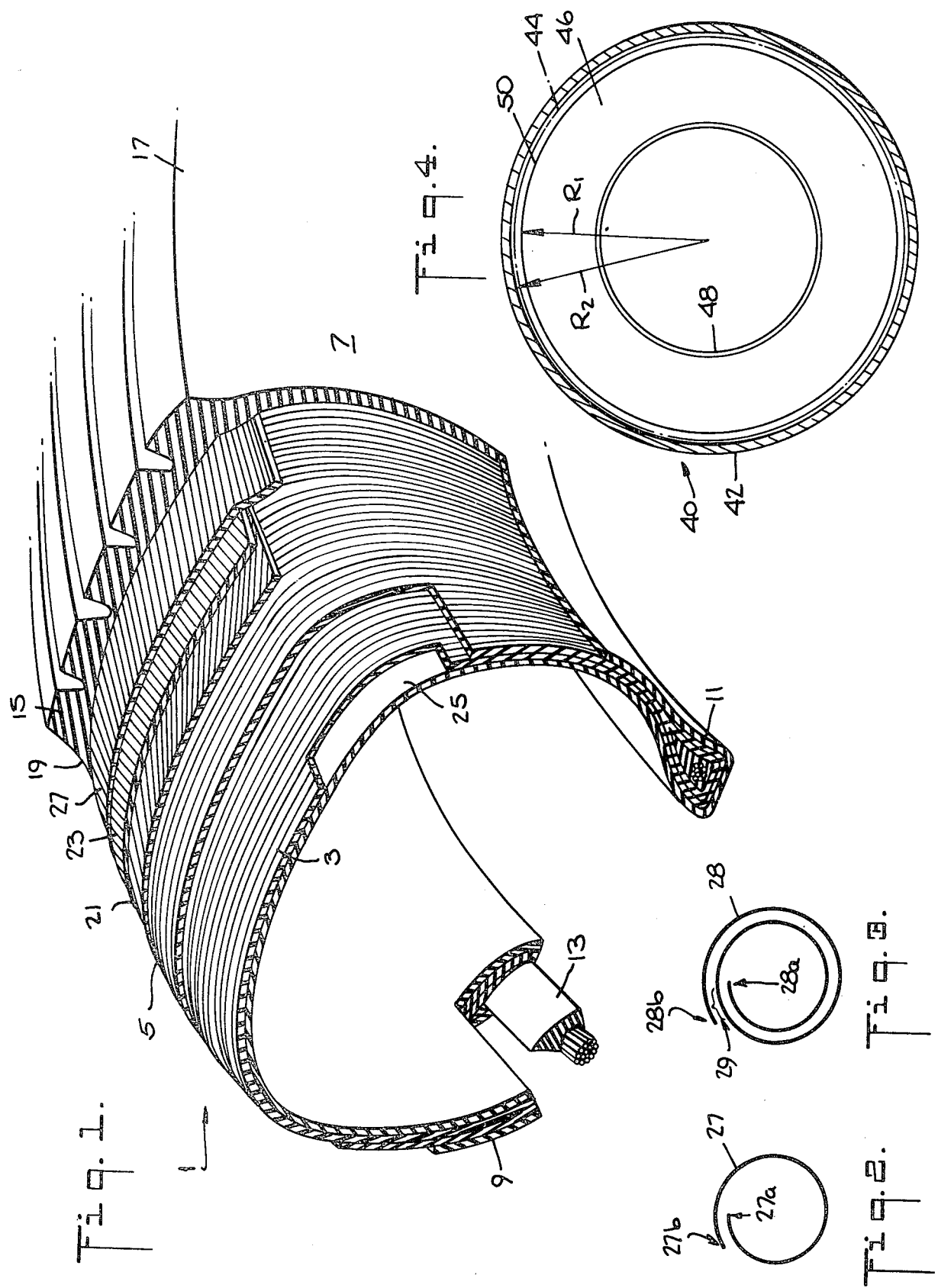

STEEL-BELTED RADIAL PLY TIRES WITH 0° TEXTILE CAP BAND

CROSS-REFERENCES TO RELATED APPLICATIONS

This application is a division of copending U.S. patent application Ser. No. 334,198, filed Feb. 21, 1973, entitled "Steel Belted Radial Ply Tires with 0° Textile Cap Band" by Robert H. Snyder and assigned to the assignee of the present invention now U.S. Pat. No. 3,850,219. Ser. No. 334,198 is a continuation-in-part of U.S. patent application Ser. No. 281,890, filed Aug. 18, 1972, and now abandoned.

BACKGROUND OF THE INVENTION

This invention relates to pneumatic tires for vehicles and more particularly to belted radial ply tires of the type having a cap band overlying the belt thereof.

The expressions "radial tires" and "radial ply tires" as commonly used in the pneumatic tire art may be said to include various tire constructions having a carcass or body comprising one or more reinforcement plies of rubberized tire cords extending from bead to bead wherein the cords in each ply are substantially radial in orientation, i.e., the cords are oriented substantially normal to the beads and to the crown centerline of the tire. In a mono-ply radial tire the carcass or body cords normally have a 90° bias angle, i.e., in the unshaped carcass they extend perpendicular to the planes of the beads. In a two-ply radial tire, the cords in each body ply are usually oriented at oppositely disposed small angles of up to 10° with respect to the perpendicular to the bead planes, in which case the respective body plies are said to have oppositely disposed bias angles of 80° or greater (but less than 90°). In four-ply or heavier radial ply tire constructions similar opposed orientation of the cords in successive body plies is usually employed. All of these body or carcass constructions are contemplated within the scope and meaning of the expressions "radial" and "substantially radial" as used herein.

Radial tires are generally constructed with a breaker or belt interposed between the crown region of the carcass and the tread for reinforcing the latter, such breaker being comprised of one or more layers or plies of tire cords or cables which are generally inextensible, i.e., made of such materials as metallic wires, glass fiber, rayon, etc. In a mono-ply belt, the cords or cables have a relatively low bias angle of 0°, i.e., they are oriented substantially parallel to the planes of the beads and to the median equatorial plane, or crown center line, of the tire. If the belt is of a multi-ply construction, similar but opposed low bias orientations of the cords or cables generally at angles ranging up to about 25°–30° or so with respect to the median equatorial plane of the tire are employed in successive plies.

It is known that many types of tires, especially radial ply carcass tires in which, as above stated, the tread is reinforced by a belt or breaker composed of superposed, mutually crossed, rubberized plies of parallel, essentially inextensible cords or cables, often fail at high speeds because separations occur in the shoulder zones of the tires where the edges of the belt plies are located. Such ply separations are due to the cord ends at the edges of the belt plies becoming detached from the surrounding rubber under the combined effects of centrifugal force acting on the tire, flexing of the tire and heat build-up in the tire. This result is made even more likely by the fact that the cords or cables in the belt plies, being disposed obliquely to the median equatorial plane of the tire by virtue of said plies being cut obliquely with respect to the longitudinal direction of the cords or cables therein, have a natural tendency to spread apart at their cut ends. The edges of the belt thus constitute zones where the cut and free ends of the reinforcing elements, i.e., the cords or cables, by friction and by cutting, cause breaks both in the carcass plies and in the rubber of the tire.

Belted radial ply tires of the type presently known in the art are further subject to the disadvantage that they tend to snake or squirm in a direction orthogonal to the direction of motion of the vehicle on which they are mounted, which results in excessive tire wear, premature tire failure and excessive vibration. This snaking of tires cured in two-piece or non-segmental molds of the types known to the art, appears to be due, at least in part, to the fact that such tires must undergo their final expansion into the full mold contours after being inserted in the molds. During such expansion of a tire in the mold, the cords or cables of said belts pivot relative to each other, i.e. they pantograph to a lower bias angle than that at which the cords or cables are originally oriented in the belt plies during the building operation. Due to stresses within the tire and the uneven expansion of various portions of the tire, however, the cords or cables tend to pantograph non-uniformly, and it is the resultant non-uniform cord orientations which cause the aforementioned disadvantageous snaking.

It might be noted that belted radial ply tires having an additional band of textile cords overlying the belt are known in the art. For example, French Pat. No. 1,416,538 discloses the use of such a band having a single ply therein, the cords of which may be oriented at any desired angle from 0° to 90° to the median equatorial plane of the tire and which serves to shield the belt cords from moisture. This patent does not, however, disclose a structure which overcomes either the problem of tire distortion and ply separation at high speeds, or the problem of non-uniform pantographing of the cords or cables of the belt plies during tire manufacturing.

Another example of a belted radial ply tire utilizing an added band of textile cords over the belt is illustrated in U.S. Pat. No. 3,503,432. In that tire, the added band is made of heat-shrinkable nylon cords, and the shrinkage stresses developed in such nylon cords are utilized to condition the band to apply a compressive stress to the underlying belt plies and to absorb some of the stresses present in the tire during operation. The breaker and cap band portion of the tire must, however, be cured in a segmental mold and thus is already at its desired final diameter when being placed into the mold. Since there is no further in-mold expansion, therefore, the patent does not teach a solution to, nor even have to face the problem of, non-uniform pantographing of the belt cords during tire manufacture.

SUMMARY OF THE INVENTION

It is, therefore, an important object of the present invention to provide an improved belted pneumatic tire construction and a method of making tires having such a construction, by means of which the aforesaid drawbacks and disadvantages may be most efficaciously avoided.

It is a further object of this invention to provide a belted radial ply tire characterized by a high degree of uniformity and resistance to belt ply separation.

Generally speaking, the objectives of the present invention are attained by the provision of a belted pneumatic tire for vehicle wheels, the tire including at least two belt plies of metal cords between the tread and the crown region of the carcass, the cords extending parallel to one another in each layer and being crossed with respect to the cords of each next adjacent layer, said cords being inclined at an angle of between 16° and 30° with respect to the median equatorial plane of the tire, each said ply having a width approximately equal to that of the tread, and a cap band having at least one layer of textile cords positioned beneath the tread and radially outward with respect to said metal cord belt plies, said cap band having a width equal to or greater than that of the belt plies and being formed by at least one layer of cords extending parallel to one another and to said median equatorial plane of the tire, said textile cords being longitudinally extensible when stressed and in the finished tire being elongated between about 1% and 5% from their unstressed state, said textile cords thereby being prestressed to exert a compressive stress on the underlying belt plies for enhancing uniformity of geometrical and rolling properties of the tire and for restraining belt ply separation due to radially outward movement of said metal cords under centrifugal forces.

The use of the said cap band also enables the steel-belted radial ply tires of the present invention to be cured in a two-piece or clam shell or non-segmental mold rather than in a segmental mold as has heretofore been necessary. This advantage is due to the fact that, even though the raw preshaped tire as inserted into the mold is somewhat smaller than the mold and must undergo a final expansion of between about 1 and 5% upon being forced into the full mold contours by the high internal pressure of the curing fluid, the cap band ensures that the pantographing of the bias-angled steel belt cords to their desired final angle of between about 16° and 30° to the median equatorial plane will take place in as uniform a manner as possible so as to lead to as uniform a final tire as possible, thereby diminishing the snaking of the tire while it is in service.

BRIEF DESCRIPTION OF THE DRAWINGS

The foregoing and other objects and features of the present invention will be more clearly understood from the following detailed description thereof when read in conjunction with the accompanying drawings, in which:

FIG. 1 is a partially sectioned perspective view of a belted radial ply tire having a cap band according to one embodiment of the present invention;

FIG. 2 is a reduced scale schematic side view of the cap band illustrated in FIG. 1;

FIG. 3 is a schematic side view of a second embodiment of a cap band for a belted radial ply tire according to the invention; and FIG. 4 is a schematic view of a tire and mold illustrating the final expansion of a tire within the mold according to the invention.

DESCRIPTION OF THE PREFERRED EMBODIMENT

Referring now to FIG. 1 there is illustrated a tire 1 comprising two radial or substantially radial superposed carcass plies 3 and 5, sidewalls 7 and 9 overlying the respective lateral regions of the carcass and terminating at their radially inwardmost edges in a pair of beads 11 and 13, a tread 15 overlying the crown region of the carcass and adjoining the sidewalls 7 and 9 at their radially outwardmost regions, i.e., in the area of shoulders 17 and 19 of the tire, two belt breaker plies 21 and 23 superposed one on the other and both interposed between the crown region of the carcass and the tread for reinforcing the latter, a fluid-impervious liner 25 radially inward of carcass or body ply 3 and extending from bead 11 to bead 13, and a single layer cap band 27 interposed between radially outwardmost belt ply 23 and tread 15.

Describing the cord ply components of the tire in a radially outward direction, body plies 3 and 5 are layers of rubberized cords or cables made of any suitable natural or synthetic fiber such as nylon, rayon, polyester, metal wire, glass fiber, etc., and each of the body plies 3 and 5 extends from bead to bead. In the body plies illustrated, the cords in each body ply are oriented at oppositely disposed small and normally equal angles of up to about 10° with respect to true radial planes, and thus the respective body plies have opposite bias angles of between 80° and 90° with respect to the median equatorial or mid-circumferential plane. The belt plies 21 and 23 are layers of rubberized, parallel, metallic reinforcing elements, preferably steel, which may be either lamelliform, i.e., in the form of flat strips or bands with rounded edges, or filiform, i.e., in the form of generally round wires or cables, and these plies are approximately equal in width to the tread 15. The steel reinforcing elements in each ply are oriented at a substantial bias angle of between about 16° and 30° to the median equatorial plane of the tire.

The cap band 27 which is superposed on the radially outwardmost belt ply 23 and is therefore in direct contact with the ply 23, is a rubberized layer of a plurality of parallel cords or cables of a non-metallic textile material, for example rayon, nylon, polyester, etc., and said textile cord or cables are oriented at a substantially 0° bias angle, i.e., they are substantially parallel to the median equatorial plane of the tire. Cap band 27 is at least as wide as the widest one of said belt plies 21 and 23 and preferably between about 20 and 60 millimeters wider than said belt plies, i.e., 10 to 30 mm wider on each side of the belt.

Turning now to FIG. 2, there is schematically illustrated a reduced scale side view of cap band 27 shown in FIG. 1. It will be noted that cap band 27 comprises the aforementioned single layer of rubberized textile material and that there is some selected overlap of, and corresponding adhesion of the marginal portion between, the ends 27a and 27b of the band 27. The function of the splice overlap and adhesion of the marginal portions of cap band 27 to one another is to minimize slippage of the band ends 27a and 27b relative to one another during expansion of the tire into the mold of a vulcanization press. Notwithstanding the overlapping of ends 27a and 27b, however, it has been found that the use of a single layer cap band results in a moderate amount of slippage in the splice overlap thereof during the in-mold expansion. This slippage causes tread 15 to stretch non-uniformly in the area overlying the splice overlap and results in a depression across the tread from shoulder 17 to shoulder 19. It may also cause one or more of the steel breaker plies 23 and 21 to pantograph in a slightly non-uniform manner in the area of the cap band splice overlap, with attendant snaking problems. Such slippage can also result in out-of-roundness of the tire in the slippage area, and in the narrowing of one or more of the steel breaker plies in such area.

Turning now to FIG. 3, there is illustrated a schematic side view of a second embodiment of a cap band 28 according to the invention, which cap band may advantageously be substituted for the cap band of the tire shown in FIG. 1 when it is desired to further minimize slippage at the marginal portions of the cap band during the final in-mold expansion of the tire. The cap band 28 illustrated in FIG. 3 is constituted by two rubberized layers of parallel ply textile cords or cables formed from a single length of textile material which has been spirally wrapped slight more than twice about the crown portion of the tire. In this arrangement the band ends 28a and 28b define a region of overlap 29 wherein the outer marginal portion of the band and the inner marginal portion of the band adhere to opposite sides of a continuous central layer of the band. The region of overlap 29 is thus reinforced by the continuous central layer of the band and slippage of ends 28a and 28b relative to one another is diminished. The tread 15 will therefore stretch more uniformly above the region of overlap and the belt ply 23 will narrow less under the region of overlap in the FIG. 3 embodiment than will be the case where the single layer cap band of FIG. 2 is utilized. It is here appropriate to note that it is desired that the cap band exert the same selected amount of compressive stress on the underlying belt plies irrespective of whether a single layer or a two layer cap band is being utilized. To achieve this end it has been found advantageous, when employing a two layer cap band having cords or cables of similar physical properties to utilize only one-half as many parallel textile cords or cables per transverse measure as when a single layer cap band is employed. For example, if, when a single layer cap band is utilized, it has been found that the appropriate compressive stress is applied to the underlying belt plies when the cap band is constituted by 24 cords (or ends) per transverse inch, then a band constituted by 12 cords per transverse inch is appropriate when a two layer spiral wound cap band is used. Alternatively, the physical properties of the cords or cables in the two layer cap band may be so chosen as to require various other numbers of cord ends per inch, such selection being well within the normal skill of the art.

Turning now to FIG. 4, there is schematically illustrated a non-segmental or two-piece mold 40 of a type well known in the art, such a mold being, of course, one which has a continuous tread groove forming periphery and is thus incapable of radial expansion or contraction. Such a mold in essence has a lower mold section 42 and an upper mold section (not shown). The inner mold surfaces carry a plurality of ridges or like protrusions, indicated in FIG. 2 by the dot-dash line 44, to form the grooves in the tire tread. Since as above stated, this mold is of the non-segmental type, it will be clear that the preshaped tire 46, commonly referred to by those in the art as a "second stage carcass," will have to have an outer radius $R_1$ somewhat smaller than the inner radius of the envelope of the groove-forming protrusions so that said second stage carcass may be easily inserted into mold 40. The second stage carcass thus is somewhat smaller than it will ultimately be when fully expanded into the mold. As shown, the mold has an inner radius $R_2$ which is between about 1 and 5% greater than radius $R_1$.

After insertion of the preshaped tire 46 into mold 40, with the beads 48 properly seated, the mold is closed and high pressure heating fluid, e.g., steam or hot water, is admitted into the curing bag or bladder (not shown) to expand the same and therewith the carcass 46 in a radially outward direction until the peripheral surface 50, i.e., the tread, of said carcass contacts the inner surface of the mold.

It is during this final in-mold expansion of the tire than another advantage is obtained by using a cap band constituted by at least a single layer of cords which are longitudinally extensible and which are oriented at a substantially 0° angle with respect to the median equatorial plane of the tire. It should be noted that in the manufacture of a belted tire as herein contemplated, the carcass is built in substantially flat or cylindrical form and is then shaped to its toroidal form, whereupon the belt plies, the cap band in an unstressed condition, and the overlying tread rubber are applied to the crown region of the shaped carcass to complete the raw tire. The latter will, of course, as previously stated, have an outer diameter somewhat smaller than the inner mold surface diameter. Accordingly, there will be some degree of pantographing of the belt cords, which may be non-uniform if not properly regulated, during the final expansion of the tire in the mold. During that final expansion of the tire, however, the cords of the cap band will be also longitudinally extended in the same degree, i.e., between about 1 and 5% and preferably between about 1 and 3% of their initial unstressed length, and by virtue of their juxtaposition to the belt plies will exert a restraining force on the metal cords of the belt plies so as to ensure that the belt cords will pantograph as uniformly as possible. The significance of this feature is that by minimizing the tendency of the belt cords to pantograph non-uniformly, it becomes possible to avoid an ultimate tire construction that may be sufficiently non-uniform to cause the tire, when in service, to snake excessively and possibly suffer premature failure.

After the mold cycle is completed, the still hot tire is removed from the press and mounted on a post inflation chuck where it is inflated to a pressure of between about 30 and 50 p.s.i. until the tire is sufficiently cool to permit further handling. The post inflation treatment not only ensures that the tire will be maintained in a uniform configuration during the cooling period, but also that the cords of cap band 27 will retain the prestress applied thereto by their longitudinal extension during the final in-mold expansion of the tire. Accordingly, the cap band cords will exert the desired radially inward compressive stress on the belt plies of the tire even after the end of the post inflation treatment, thereby actively aiding in maintaining the tire in as uniform a condition as possible. The prestressing of the cap band cords also affords a number of other benefits. For example, at high speeds, standing waves may be set up within a belted tire due to distortions of the belt, which could cause premature tire deterioration. The cap band 27, by virtue of its compressive action, tends to avoid this problem. The cap band will also minimize the risk of belt ply separation which could occur at high speeds due to the effects of centrifugal forces if no such band were present. It is for this purpose, of course, that the cap band must have a width at least as great as the widest of the belt plies and preferably somewhat wider, so that the cap band cords will continuously urge the lateral edges of said belt plies toward the carcass.

Although the foregoing description has described belt plies 21 and 23 primarily as utilizing steel or like metal cords or cables as the reinforcing elements, it will be understood that the principles of the invention are applicable to belts having cords of other high modulus materials, such as rayon, glass fiber, Fiber B, and the like, incorporated therein.

It will be understood that the foregoing description of the preferred embodiment of the present invention is for purposes of illustration only, and that the various structural and operational features as herein disclosed are susceptible to a number of modifications and changes none of which entail any departure from the spirit and scope of the present invention as defined in the hereto appended claims.

Having thus described the invention, what is claimed and desired to be protected by Letters Patent is:

1. In the method of making a radial ply tire having between the crown region of the carcass thereof and the surrounding tread a belt composed of at least two superposed plies of high modulus belt cords oriented at an angle of between about 16° and about 30° with respect to the median equatorial plane of the tire, with the belt cords being parallel to each other within each belt ply and being crossed with respect to cords in each next adjacent belt ply, wherein the carcass is built in substantially cylindrical form, said carcass is then shaped to toroidal form, and the belt and the tread are thereafter applied to the crown region of the shaped carcass preparatory to the placing of the raw tire into the mold for curing; the improvement comprising the steps of incorporating between the radially outwardmost belt ply and the tread during the building operation a cap band having at least one layer which is at least as wide as the widest of said belt plies and has incorporated therein a plurality of textile cords oriented substantially parallel to one another and to said median equatorial plane, with said cap band in direct contact with the radially outwardmost one of said belt plies, placing said raw tire into a two-piece mold, and applying internal fluid pressure to said raw tire upon closing of the mold for expanding said raw tire fully into the mold contours and concurrently stressing said textile cords in said cap band to elongate by between about 1% and about 5% from their unstressed condition, said textile cords thereby exerting a restraining force on said belt plies to ensure substantially uniform pantographing of said belt cords during said expansion.

2. The method of claim 1, wherein said raw tire is expanded to elongate said textile cords between about 1% and about 3% from their unstressed condition.

3. The method of claim 1, wherein said raw tire is expanded to elongate said textile cords about 3% from their unstressed condition.

4. The method of claim 1, wherein said cap band comprises a single layer of textile cords.

5. The method of claim 1, wherein said cap band comprises two layers of textile cords, formed from a single length of spirally wrapped textile material, the textile cords in each of said layers being oriented substantially parallel to one another and to said median equatorial plane and being stressed to elongate them by between about 1% and about 5% from their unstressed condition.

* * * * *